United States Patent
Wu

(10) Patent No.: US 11,295,737 B2
(45) Date of Patent: Apr. 5, 2022

(54) VOICE CONTROL METHOD AND VOICE CONTROL SYSTEM FOR IN-VEHICLE DEVICE

(71) Applicant: GETAC TECHNOLOGY CORPORATION, Hsinchu County (TW)

(72) Inventor: Ming-Zong Wu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 202 days.

(21) Appl. No.: 16/405,921

(22) Filed: May 7, 2019

(65) Prior Publication Data

US 2020/0357393 A1 Nov. 12, 2020

(51) Int. Cl.
| | |
|---|---|
| G06F 3/16 | (2006.01) |
| G10L 15/22 | (2006.01) |
| B60K 35/00 | (2006.01) |
| G11B 20/10 | (2006.01) |

(52) U.S. Cl.
CPC ............. *G10L 15/22* (2013.01); *B60K 35/00* (2013.01); *G06F 3/167* (2013.01); *B60K 2370/148* (2019.05); *G06F 3/16* (2013.01); *G10L 2015/223* (2013.01); *G11B 20/10527* (2013.01)

(58) Field of Classification Search
CPC ... G10L 15/22; G10L 2015/223; B60K 35/00; B60K 2370/148; G06F 3/167; G06F 3/16; G11B 20/10527
See application file for complete search history.

(56) References Cited

U.S. PATENT DOCUMENTS

| | | | |
|---|---|---|---|
| 2017/0120803 A1* | 5/2017 | Kentley | B60W 10/18 |
| 2018/0050800 A1* | 2/2018 | Boykin | H04B 7/18506 |
| 2020/0322566 A1* | 10/2020 | Vanman | H04N 21/41422 |

\* cited by examiner

*Primary Examiner* — Phuong H Nguyen

(57) ABSTRACT

A voice control method for an in-vehicle device includes receiving an audio signal by an information capturing device, transmitting the audio signal to a base of the information capturing device by the information capturing device, performing voice recognition on the audio signal by the base to generate at least one context instruction, transmitting the at least one context instruction to a host of an in-vehicle device by the base, and correspondingly controlling an operation of at least one function module of the in-vehicle device according to the at least one context instruction to perform at least one context operation by the host.

19 Claims, 8 Drawing Sheets

VOICE CONTROL METHOD AND VOICE CONTROL SYSTEM FOR IN-VEHICLE DEVICE

BACKGROUND OF THE INVENTION

Field of the Invention

The present invention relates to a voice control technology, and more particularly to a voice control method and a voice control system for an in-vehicle device.

Description of the Prior Art

It is extremely common that users currently generally use an information capturing device mounted in a common vehicle to automatically record images and associated values of the inside and the outside of a carrier. Media information recorded by an information capturing device can further record an on-site situation at the time of an event taking place, and can be later used for purposes of evidence provision and responsibility clarification.

In general, a carrier usually provides one or multiple operation interfaces for a user to use or to set an in-vehicle device. However, regardless of how convenient the design of the operation interface may be, a user is nonetheless required to spend time on confirming the operation interface, leading to operation inconvenience in operating the operation interface while a user is operating the carrier.

SUMMARY OF THE INVENTION

In one embodiment, a voice control method for an in-vehicle device includes receiving an audio signal by an information capturing device, transmitting the audio signal to a base of the information capturing device by the information capturing device, performing voice recognition on the audio signal by the base to generate at least one context instruction, transmitting the at least one context instruction to a host of an in-vehicle device by the base, and correspondingly controlling an operation of at least one function module of the in-vehicle device according to the at least one context instruction to perform at least one context operation by the host.

In one embodiment, a voice control method for an in-vehicle device is suitable for a base of an information capturing device. The voice control method includes receiving an audio signal from the information capturing device, performing voice recognition on the audio signal to generate at least one context instruction, and transmitting the at least one context instruction to a host of the in-vehicle device, to enable the host to correspondingly control an operation of at least one function module of the in-vehicle device according to the at least one context instruction to perform at least one context operation.

In one embodiment, a voice control system for an in-vehicle device includes an information capturing device, a base, at least one function module, and a host. The information capturing device detects and generates an audio signal. The base is for mounting and charging the information capturing device, and includes a first connecting unit, a voice recognition engine and a second connecting unit. The first connecting unit is electrically and signally coupled to the information capturing device, and is configured to receive the audio signal. The voice recognition engine is electrically and signally coupled to the first connecting unit, and is configured to perform voice recognition on the audio signal to generate at least one context instruction. The second connecting unit is electrically and signally coupled to the voice recognition engine, and is configured to output the at least one context instruction. The host is electrically and signally connected to the second connecting unit and at least one function module, and is configured to receive the at least one context instruction through the second connecting unit, and to correspondingly control an operation of the at least one function module according to the at least one context instruction to perform at least one context operation.

In conclusion, the voice control method and the voice control system for an in-vehicle device according to embodiments of the present invention are capable of performing voice recognition on an audio signal by using a base to obtain actual voice contents to further output a corresponding context instruction, so as to enable a host to perform an operation corresponding to the context instruction in response to the context instruction.

DETAILED DESCRIPTION OF THE EMBODIMENTS

Figure 1:
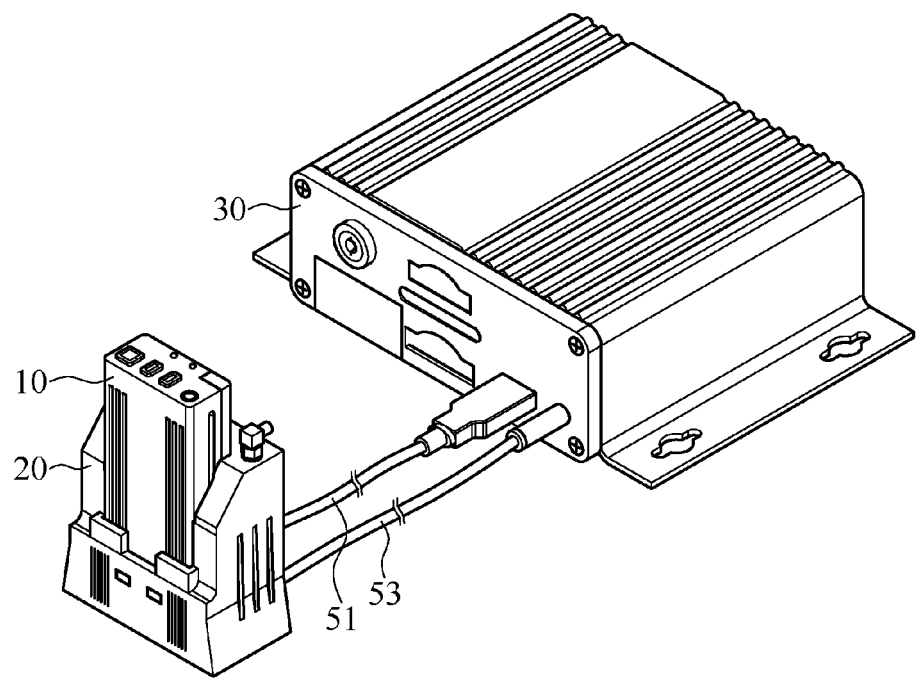
FIG. 1 is a schematic diagram of a voice control system according to an embodiment of the present invention.

Referring to FIG. 1, a voice control system for an in-vehicle device is suitable for an information capturing device 10 to control a host 30 through a base 20 of the information capturing device 10.

Figure 2:
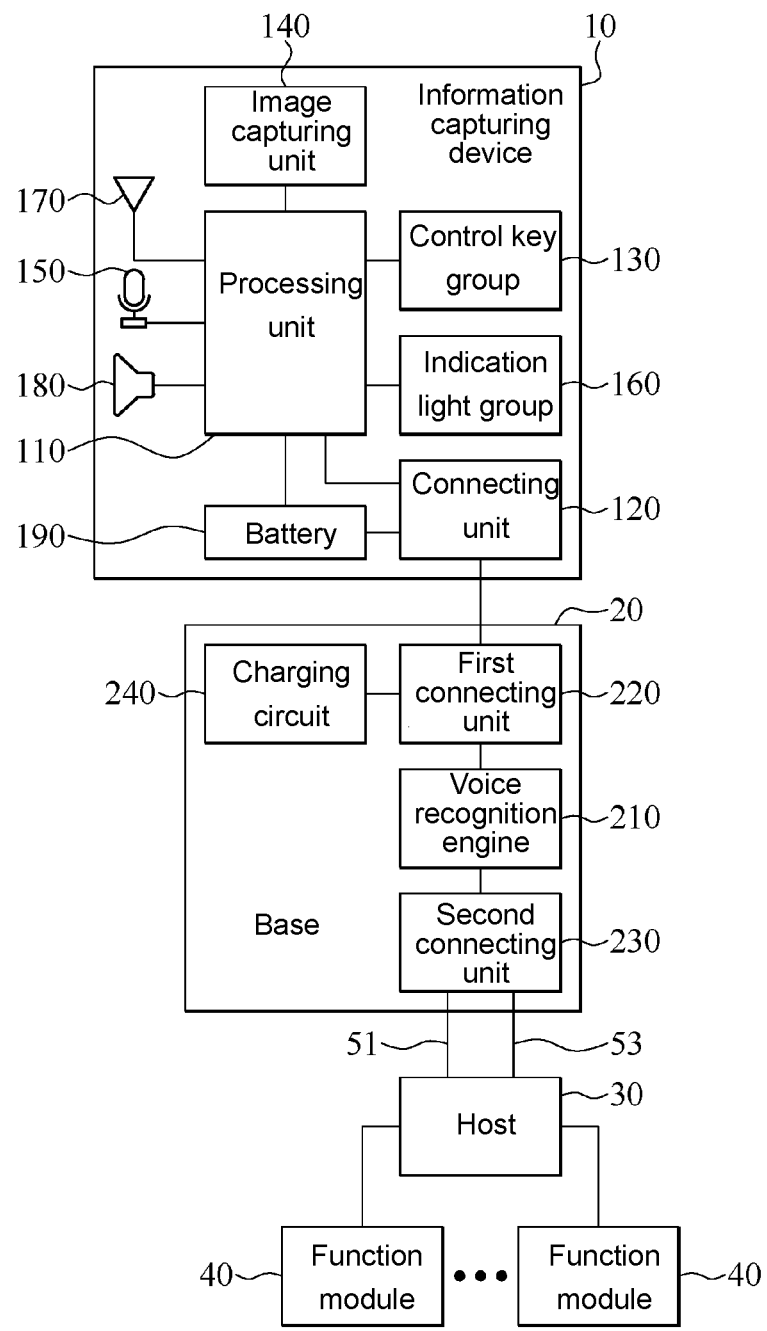
FIG. 2 is a function block diagram of a first example of the voice control system in FIG. 1.

Referring to FIG. 1 and FIG. 2, the voice control system includes an information capturing device 10, a base 20, a host 30 and at least one function module 40.

In some embodiments, the information capturing device 10 is coupled to a connecting unit (to be referred to as the first connecting unit 220 below) of the base 20 through a connecting unit thereof 120, so as to electrically and signally couple the information capturing device 10 to the base 20. The base 20 can be electrically and signally coupled by another connecting unit thereof (to be referred to as a second connecting unit 230) to the connecting unit (not shown) of the host 30 through a USB connecting line 51 and an audio line 53, so as to electrically and signally couple the base 20 to the host 30. The host 30 is further electrically and signally coupled to the function modules 40. In an example, the information capturing device 10 can be a wireless microphone, a wireless walkie talkie or a portable camera device. Wherein, the portable camera device can be a video recorder, a body video camera, a portable search video camera or a miniature video camera mounted on a hat or a garment. The host 30 can be, for example, a digital video recorder in car (car DVR)).

In some embodiments, the host 30 and the function modules 40 coupled thereto can be built in an in-vehicle device and/or be externally connected to one or more in-vehicle devices (including the function modules 40). The base 20, the host 30 and the in-vehicle device corresponding to the host 30 can be mounted on a mobile carrier (e.g., a vehicle), and the information capturing device 10 can be mounted in a pluggable form on the base 20.

When the information capturing device 10 is a wireless microphone or a wireless walkie talkie, the information capturing device 10 includes a processing unit 110, a connecting unit 120 and an audio collecting unit 150.

The processing unit 110 is electrically and signally coupled to the connecting unit 120 and the audio collecting unit 150.

In some embodiments, when the information capturing device 10 is a portable camera device, the information capturing device 10 further includes an image capturing unit 140. In a general operation, the processing unit 110 can perform image capturing on an ambient environment by using the image capturing unit 140 and correspondingly generate an image signal. In some embodiments, the image capturing unit 140 can be implemented by a camera lens, a light sensing unit or an image processing unit, wherein the image processing unit can be an image signal processor (ISP).

Figure 3:
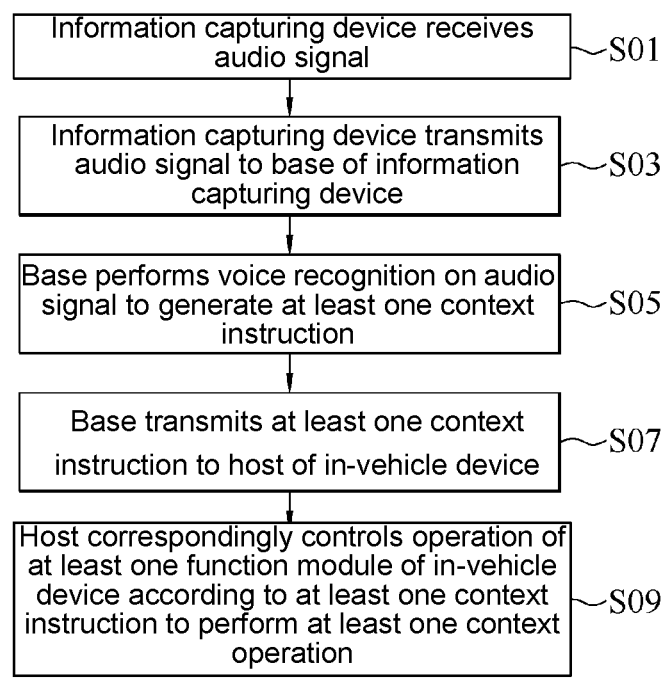
FIG. 3 is a flowchart of a voice control method according to an embodiment of the present invention.

Referring to FIG. 3, in a controlled operation, the processing unit 110 can record an ambient sound by using the audio collecting unit 150 and correspondingly generate an audio signal (step S01). Then, the audio signal generated by the information capturing device 10 is outputted to the base 20 through the connecting unit 120 (step S03).

In some embodiments, the base 20 includes a voice recognition engine 210 and two connecting units (to be referred to as a first connecting unit 220 and a second connecting unit 230 below). The voice recognition engine 210 is electrically and signally coupled to the first connecting unit 220 and the second connecting unit 230.

At this point, the base 20 is electrically and signally coupled to the information capturing device 10 through the first connecting unit 220, so as to receive the audio signal from the information capturing device 10. The voice recognition engine 210 receives the audio signal outputted from the connecting unit 120 through the first connecting unit 220, and performs voice recognition on the audio signal to generate at least one context instruction (step S05). The at least one context instruction generated by the voice recognition engine 210 of the base 20 is transmitted to the host 30 through the second connecting unit 230 (step S07). In one example, the second connecting unit 230 can be a USB input/output (I/O) interface. At this point, the base 20 outputs the at least one context instruction to the host 30 through the USB I/O interface.

The host 30 receives the at least one context instruction outputted from the second connecting unit 230, and correspondingly controls an operation of the function module 40 according to the at least one context instruction received to perform at least one context operation (step S09). The number of the context instruction outputted each time from the second connecting unit 230 can be one, or be two, three or more according to requirements.

In some embodiments, the context instruction can be an audio recording instruction, and the function module 40 can include an audio recording module. At this point, the host 30 correspondingly controls an operation of the audio recording module of the in-vehicle device to activate or deactivate audio recording. The audio recording instruction can be an audio recording activating instruction or an audio recording deactivating instruction. In one example, the host 30 correspondingly controls and activates the audio recording module according to the audio recording activating instruction to perform audio recording. In another example, the host 30 correspondingly controls and deactivates the audio recording module according to the audio recording deactivating instruction to stop audio recording.

In some embodiments, the context instruction can include a video recording instruction, and the function module 40 can include an image capturing unit. At this point, the host 30 correspondingly controls an operation of the image capturing unit of the in-vehicle device according to the video recording instruction to activate or deactivate video recording. The video recording instruction can be a video recording activating instruction or a video recording deactivating instruction. In one example, the host 30 correspondingly controls and activates the image capturing unit according to the video recording activating instruction to perform video recording. In another example, the host 30 correspondingly controls and deactivates the image capturing unit according to the video recording deactivating instruction to stop video recording.

In some embodiments, the context instruction can include an alert instruction, and the function module 40 can include an alert light. At this point, the host 30 correspondingly controls an operation of the alert light of the in-vehicle device to turn on or turn off according to the alert instruction, wherein the alert instruction can be an alert turning-on instruction or an alert turning-off instruction. In one example, the host 30 correspondingly turns on the alert light according to the alert turning-on instruction. In another example, the host 30 correspondingly turns off the alert light according to the alert turning-off instruction.

In some embodiment, the context instruction can include a help instruction, and the function module 40 can include a network module. At this point, the host 30 correspondingly controls an operation of the network module of the in-vehicle device according to the help instruction to output an emergency event alert to a remote monitoring center.

In some embodiments, the base 20 further includes a charging circuit 240, of which one end is coupled to a power supply of the vehicle and the other end is coupled to the first connecting unit 220. When the information capturing device 10 is mounted on the base 20 (i.e., when the information capturing device 10 is electrically and signally coupled to the first connecting unit 220), the charging circuit 240 of the base 20 further charges the information capturing device 10 through the first connecting unit 220. In one example, the charging circuit 240 receives power from the power supply, and provides an appropriately adjusted voltage to the information capturing device 10 through the first connecting unit 220, as power needed for operating the information capturing device 10.

In some embodiments, referring to FIG. 2, the information capturing device 10 can further include a battery 190, which is electrically and signally coupled to the connecting unit 120. When the information capturing device 10 is plugged on the base 20 (i.e., when the connecting unit 120 is electrically and signally coupled to the first connecting unit 220), the charging circuit 240 further charges the battery 190 through the first connecting unit 220 and the connecting unit 120. In one example, in addition to being provided for operating various elements of the information capturing device 10, the voltage provided by the charging circuit 240 to the information capturing device 10 through the first connecting unit 220 and the connecting unit 120 can simultaneously charge the battery 190.

In some embodiments, referring to FIG. 2, the information capturing device 10 can further include a control key group 130 and an indication light group 160. The control key group 130 is electrically and signally coupled to the processing unit 110, and the indication light group 160 is also electrically and signally connected to the processing unit 110. The control key group 130 allows a user to operate and control the information capturing device 10; that is, the control key group 130 can correspondingly generate one or more control signals in response to a user operation to enable the processing unit 110 to perform a corresponding operation and control. The indication light group 160 can indicate the operation of the information capturing device 10, and can include a light emitting driving circuit and one or more light emitting units (e.g., light emitting diodes). The control key group 130 can include one or more control keys, wherein each control key can be a key or a button.

For example, the control signal can be an activation signal, and the processing unit 110 receives the activation signal and enables the image capturing unit 140 in response to the activation signal. At this point, the indication light group 160 provides an indication signal to thereby notify the user that the image capturing unit 140 is currently performing video recording. In another example, the control signal can be a stop signal, and the processing unit 110 receives the stop signal and disables the image capturing unit 140 in response to the stop signal. At this point, the indication light group 160 provides an indication signal or stops providing the originally provided indication signal to thereby notify the user that the image capturing unit 140 has stopped video recording. In yet another example, the control signal can be a selection signal, and the processing unit 110 receives the selection signal and switches a video recording mode in response to the selection signal. At this point, the indication light group 160 provides an indication signal to thereby indicate the current video recording mode (the video recording mode after switching).

In some embodiments, referring to FIG. 2, the information capturing device 10 can further include a speaker 180, which is electrically and signally coupled to the processing unit 110. The speaker 180 issues a prompt sound corresponding to the operation of the information capturing device 10. The content of the prompt sound can be, for example but not limited to, "video recording activated", "video recording stopped", "low power capacity", "operation disabled (i.e., no prompt sound is outputted during operation)", "first video recording mode", or "second video recording mode".

In some embodiment, referring to FIG. 2, the information capturing device 10 can further include an antenna 170, which is electrically and signally coupled to the processing unit 110. The processing unit 110 can emit radio-frequency (RF) signals through the antenna 170 to thereby wirelessly communicate with another electronic device (e.g., the base 20, another information capturing device, a manager on a mobile carrier, a portable electronic device, or a server at a remote end). In one example, the processing unit 110 can communicate with a remote server (not shown) through the antenna 170 by using a long-distance wireless transmission technology. In another embodiment, the processing unit 110 can communicate with a nearby electronic device (e.g., the base 20, another information capturing device, a manager on a mobile carrier or a portable electronic device) (not shown) through the antenna 170 by using a short-distance wireless transmission or broadcasting technology.

Figure 4:
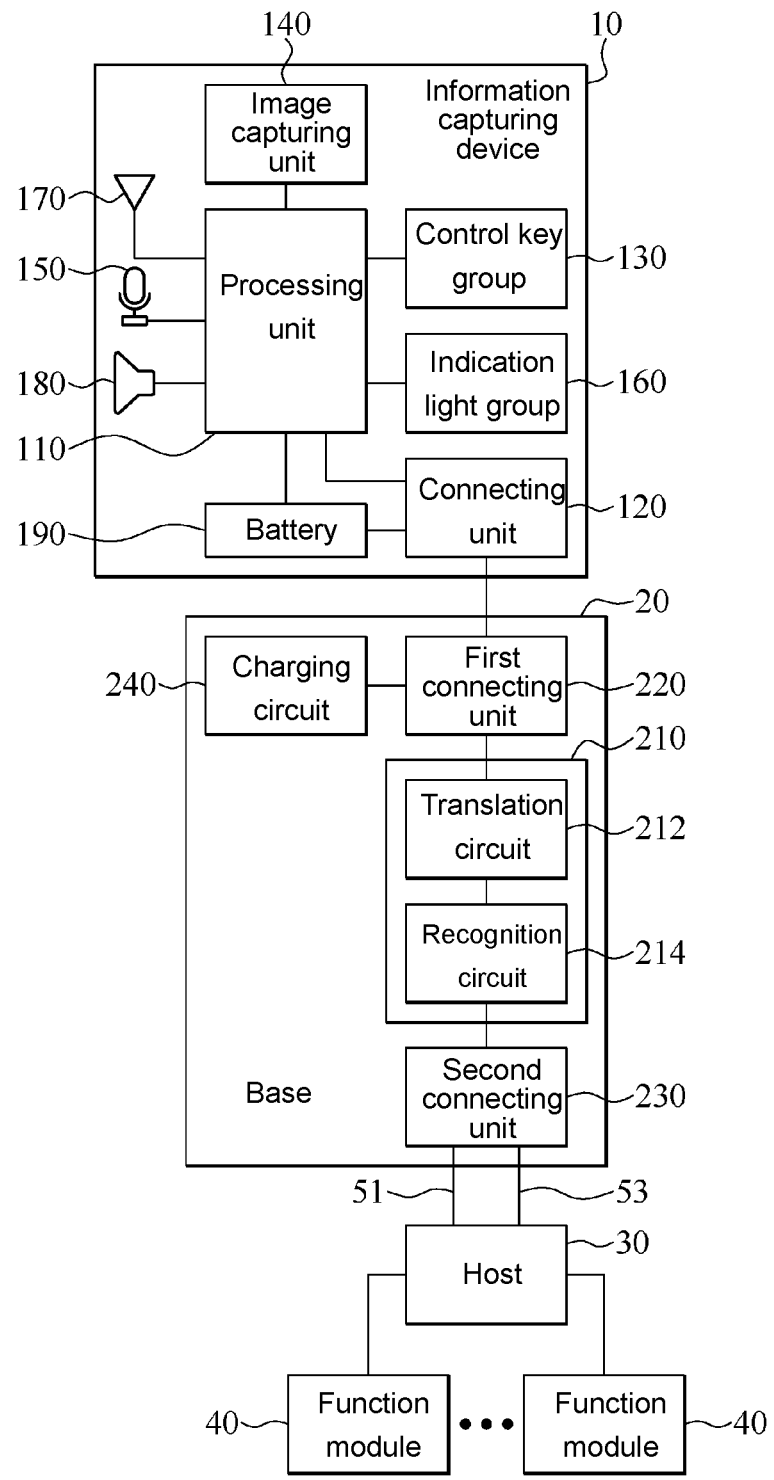
FIG. 4 is a function block diagram of a second example of the voice control system in FIG. 1.

In some embodiments, referring to FIG. 4, the voice recognition engine 210 further includes a translation circuit 212 and a recognition circuit 214. The translation circuit 212 is electrically and signally coupled to the first connecting unit 220, and the recognition circuit 214 is coupled between the translation circuit 212 and the second connecting unit 230. The translation circuit 212 receives through the first connecting unit 220 the audio signal from the information capturing device 10, and translates the audio signal. The recognition circuit 214 performs voice recognition on the translated audio signal.

Figure 5:
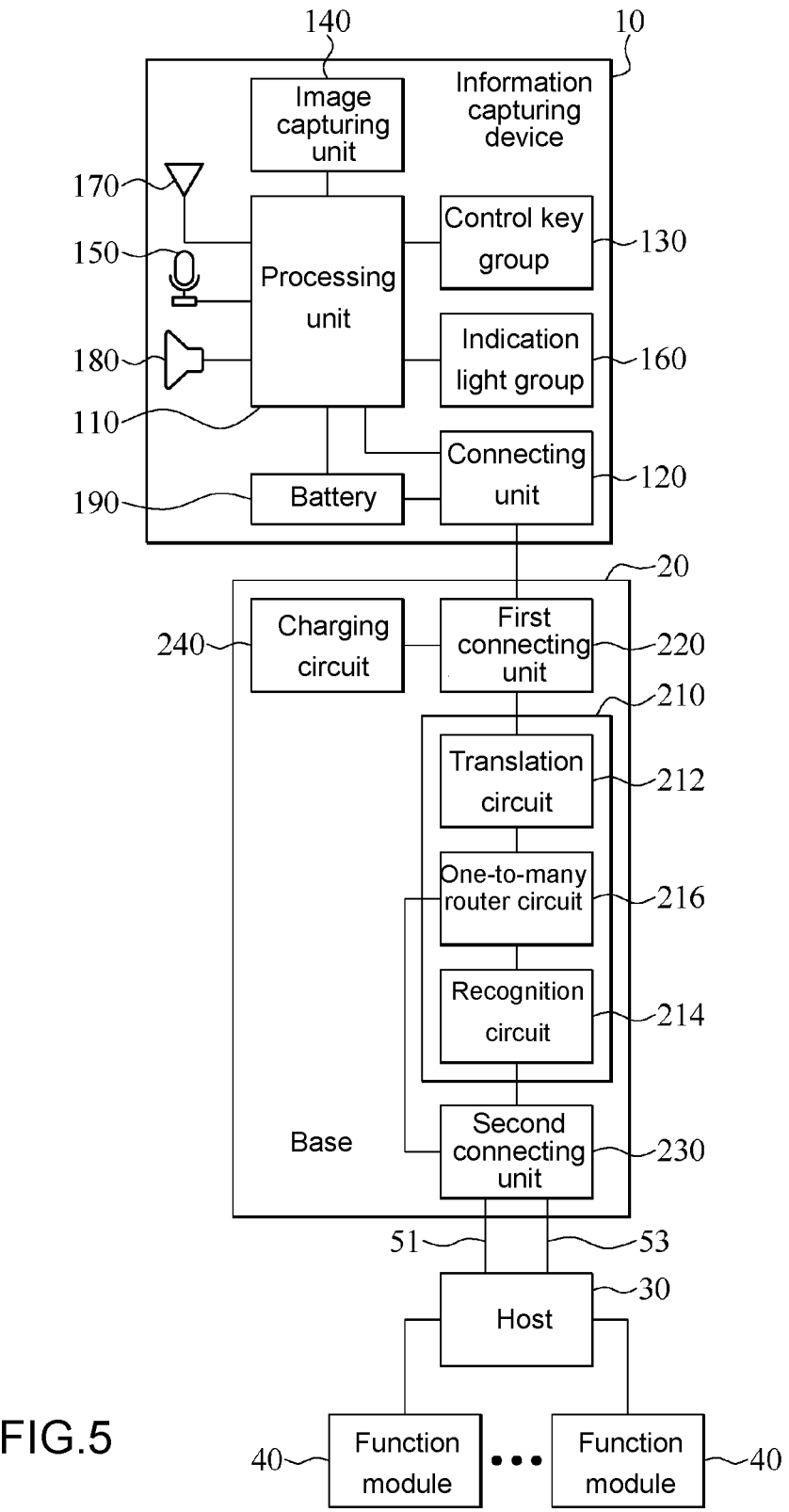
FIG. 5 is a function block diagram of a third example of the voice control system in FIG. 1.

In some embodiments, referring to FIG. 5, the voice recognition engine 210 further includes a one-to-many router circuit 216. The one-to-many router circuit 216 is electrically and signally coupled between the translation circuit 212 and the recognition circuit 214, and between the first connecting unit 220 and the second connecting unit 230.

The translation circuit 212 receives through the first connecting unit 220 the audio signal from the information capturing device 10, and translates the audio signal. The one-to-many router circuit 216 duplicates and routes the audio signal to obtain multiple input audios, outputs one of the input audios to the recognition circuit 214 for the recognition circuit 214 to perform recognition on the input audio, and further outputs another of the input audios through the second connecting unit 230 to the host 30. In one example, when an audio recording activating instruction is generated from the voice recognition performed on the translated audio signal by the recognition circuit 214, the host 30 can correspondingly control and activate the audio recording module according to the audio recording activating instruction to record the input audio received; meanwhile, the recognition circuit 214 can still continue recognition on the input audio and perform processing corresponding to the instruction.

Figure 6:
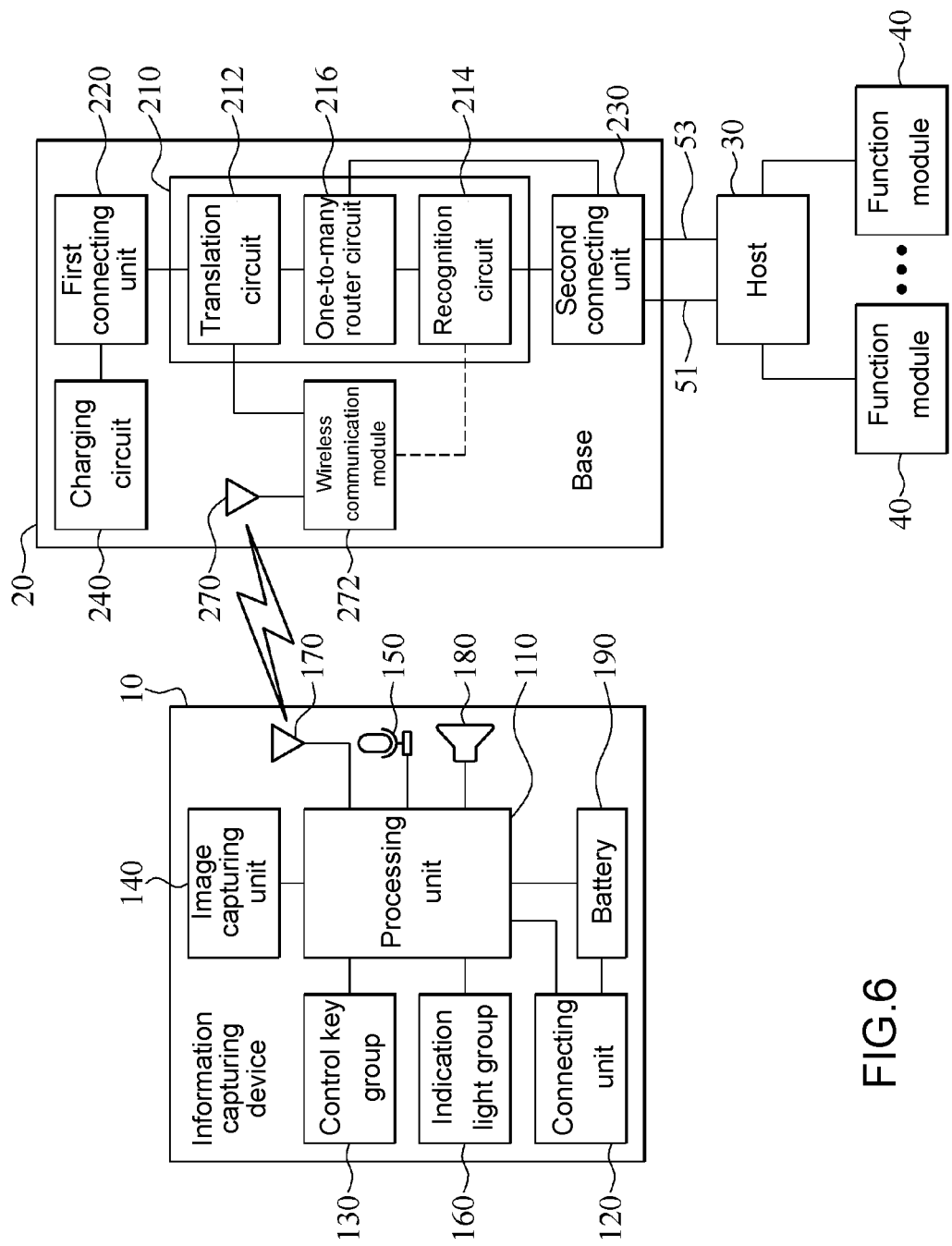
FIG. 6 is a function block diagram of a fourth example of the voice control system in FIG. 1.

In some embodiments, referring to FIG. 6, when the information capturing device 10 is not plugged on the base 20, the information capturing device 10 is coupled to the base 20 by means of wireless communication. Thus, the base 20 can still receive the audio signal from the information capturing device 10, and perform voice recognition on the audio signal by using the voice recognition engine 210 to generate at least one operation instruction, wherein the operation instruction is transmitted to the information capturing device 10 by means of wireless communication or transmitted to the host 30 through the second connecting unit 230, such that the information capturing device 10 or the host 30 correspondingly performs at least one operation according to the at least one operation instruction received, wherein the operation instruction can be an audio recording instruction, a video recording instruction, a mute and vibrate instruction or a help instruction. When the operation instruction is an audio recording instruction/video recording instruction, the information capturing device 10 is caused to correspondingly control the audio collecting unit 150/image capturing unit 140 of the information capturing device 10 to operate to activate or deactivate audio recording/image recording according to audio recording instruction/video recording instruction, and to control the host 30 to store or not to store the audio/image recorded by the information capturing device 10. When the operation instruction is a mute and vibrate instruction, the information capturing device 10 is caused to operate to activate or deactivate the mute and vibrate function. When the operation instruction is a help instruction, the host 30 correspondingly controls the operation of the network module of the in-vehicle device according to the help instruction to output an emergency event alert to a remote monitoring center.

In some embodiments, the base 20 can further include an antenna 270 and a wireless communication module 272. The wireless communication module 272 is electrically and signally coupled between the antenna 270 and the translation circuit 212, and/or electrically and signally coupled between the antenna 270 and the recognition circuit 214. The wireless communication module 272 establishes wireless communication by using the antennas 270 and 170 to the information capturing device 10 to transmit wireless RF signals (e.g., the foregoing audio signal and/or operation instruction). In other words, the translation circuit 212 (and/or the recognition circuit 214) and the wireless communication module 272 wirelessly communicate with the processing unit 110 through the antennas 270 and 170. The wireless communication module 272 can correspond to the information capturing device 10 supporting wireless communication to thereby support a long-distance wireless transmission technology or a short-distance wireless transmission technology.

Figure 7:
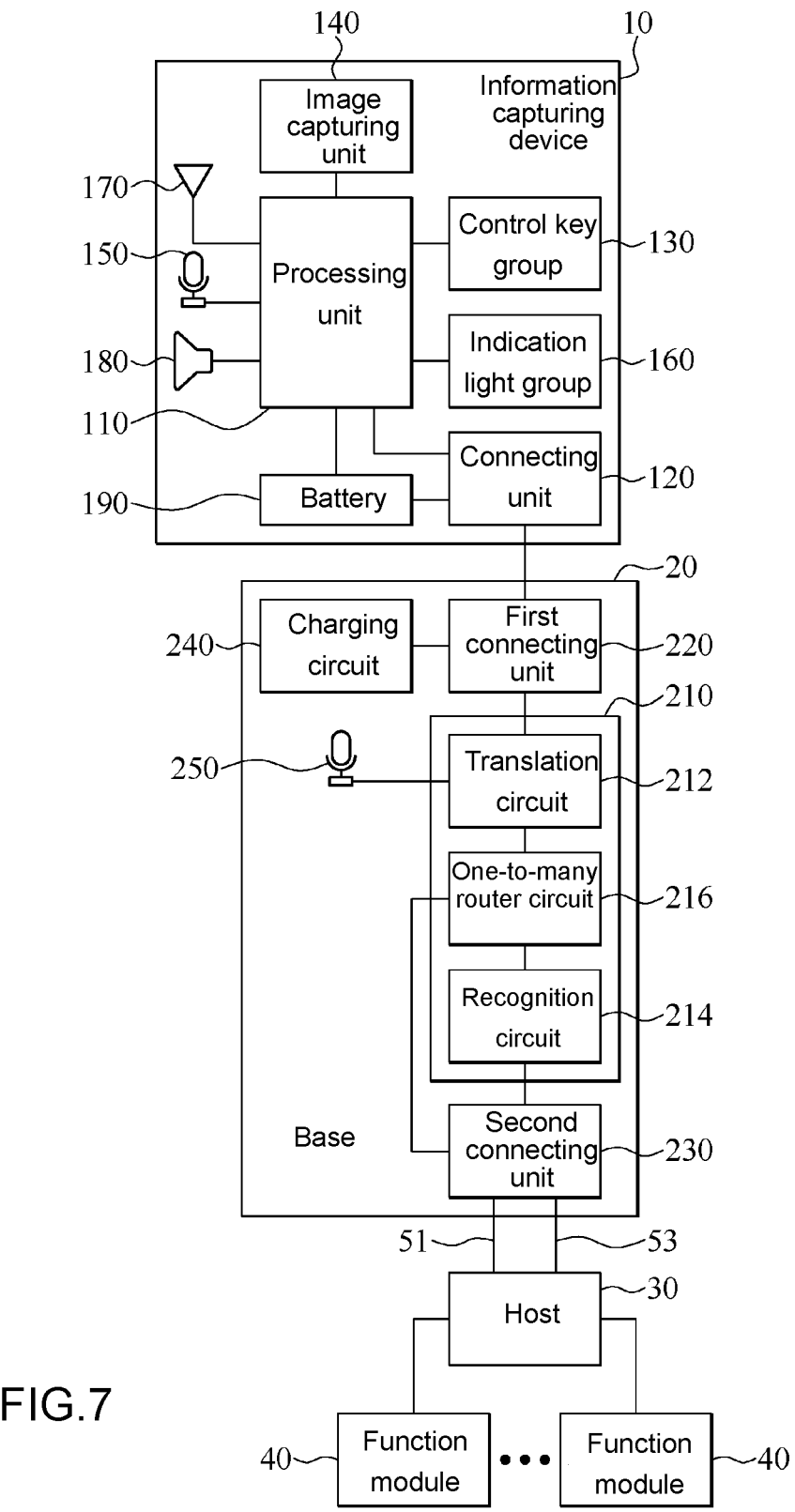
FIG. 7 is a function block diagram of a fifth example of the voice control system in FIG. 1.
Figure 8:
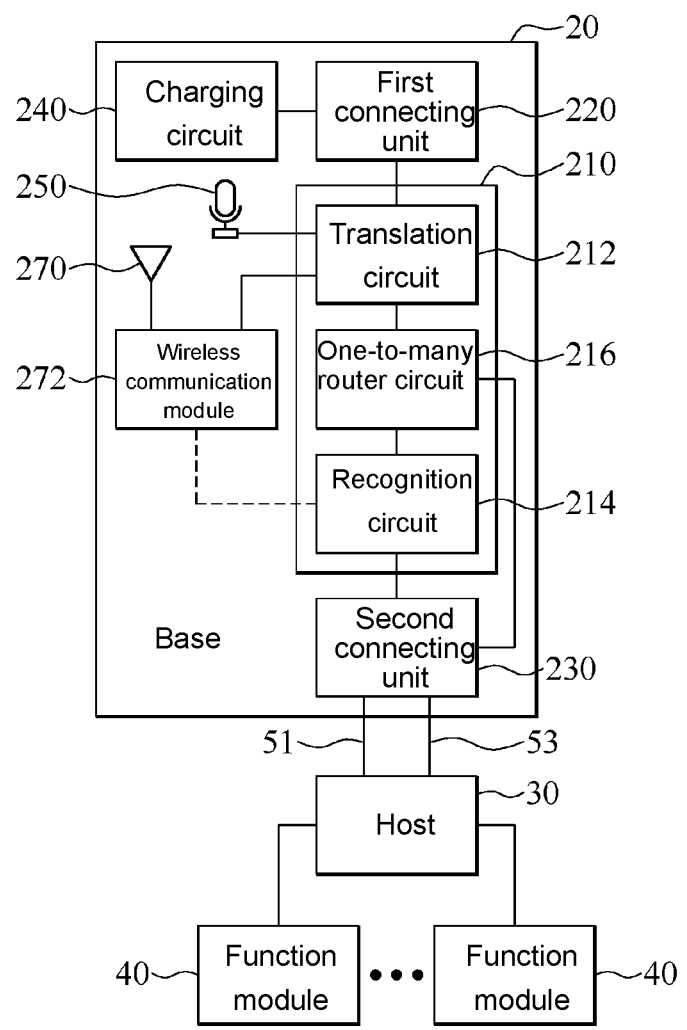
FIG. 8 is a function block diagram of a sixth example of the voice control system in FIG. 1.

In some embodiments, referring to FIG. 7 and FIG. 8, because the base 20 can include the audio collecting unit 250, the base 20 can also record an ambient sound by using the audio collecting unit 250, and perform voice recognition by using the voice recognition engine 210 to generate a context instruction. The host 30 then correspondingly controls the operation of the function module 40 according to the context instruction received to perform a context operation.

At this point, the audio collecting unit 250 is electrically and signally coupled to the translation circuit 212. The translation circuit 212 can record an ambient sound by using the audio collecting unit 250 to correspondingly generate an audio signal, and translate the audio signal. The one-to-many router circuit 216 duplicates and routes the audio signal to obtain multiple input audios, outputs one of the input audios to the recognition circuit 214 for the recognition circuit 214 to perform recognition on the input audio, and further outputs another of the input audios through the second connecting unit 230 to the host 30. In an example, when the information capturing device 10 is not plugged on the base 20, and an audio recording activating instruction and an alert activating instruction are generated from the voice recognition performed on the translated input audio by the recognition circuit 214, the host 30 can correspondingly control and activate/turn on the audio recording module and the alert light according to the audio recording activating instruction and the alert light turning-on instruction, so as to record the input audio received and to turn on the alert light.

In some embodiment, the voice recognition engine 210 can be implemented by one or more processing units.

In some embodiments, each of the processing units can be a microprocessor, a microcontroller, a digital signal processor (DSP), a microcomputer, a central processing unit (CPU), a field-programmable gate array (FPGA), programmable logical device, a state machine, a logical circuit, an analog circuit, a digital circuit, and/or any device operating a signal (analog or digital) based on an operation instruction.

In some embodiments, one of the connecting unit 120 and the first connecting unit 220 can be, for example, a POGO connector, and the other can be a connecting pad group matching the POGO connector.

In some embodiments, each of the audio recording units can be a built-in microphone or microphone array.

In some embodiments, the long-distance wireless transmission technology can be, for example but not limited to, transmission technologies such as a Wi-Fi (a Wi-Fi hotspot) and Long-Term Evolution (LTE). The short-distance wireless transmission or broadcasting technology can be, for example but not limited to, transmission technologies such as infrared, Bluetooth, UWB, ZigBee, ANT, Near-Field Communication (NFC).

In conclusion, the voice control method and the voice control system for an in-vehicle device provided according to the embodiments of the present invention are capable of obtaining actual voice contents by performing voice recognition on an audio signal using a base to further output a corresponding context instruction, thereby enabling a host to perform an operation corresponding to the context instruction in response to the context instruction.

What is claimed is:

1. A voice control method for an in-vehicle device, comprising:
   mounting a portable information capturing device on a base, wherein the base is configured to charge the portable information capturing device and is connected to a host of the in-vehicle device;
   receiving an audio signal by the portable information capturing device;
   transmitting the audio signal to the base by the portable information capturing device;
   performing voice recognition on the audio signal by the base to generate at least one context instruction;
   transmitting the at least one context instruction to the host by the base; and
   correspondingly controlling at least one function module of the in-vehicle device according to the at least one context instruction to perform at least one context operation by the host;
   wherein the portable information capturing device detects an ambient sound by using an audio collecting unit and generates the audio signal therefrom.

2. The voice control method for an in-vehicle device according to claim 1, wherein the host correspondingly controls an operation of an audio recording module of the in-vehicle device according to an audio recording instruction in the at least one context instruction to activate or deactivate audio recording.

3. The voice control method for an in-vehicle device according to claim 1, wherein the host correspondingly controls an operation of an image capturing unit of the in-vehicle device according to a video recording instruction in the at least one context instruction to activate or deactivate video recording.

4. The voice control method for an in-vehicle device according to claim 1, wherein the host correspondingly controls an operation of an alert light of the in-vehicle device according to an alert instruction in the at least one context instruction to turn on or turn off the alert light.

5. The voice control method for an in-vehicle device according to claim 1, wherein the host correspondingly controls an operation of a network module of the in-vehicle device according to a help instruction in the at least one context instruction to output an emergency event alert.

6. The voice control method for an in-vehicle device according to claim 1, further comprising:
   translating the audio signal;
   duplicating the translated audio signal to obtain a plurality of input audios; and
   outputting one of the input audios through an audio input/output router to the host.

7. The voice control method for an in-vehicle device according to claim 6, wherein the step of performing voice recognition on the audio signal comprises voice recognition on another of the input audios.

8. The voice control method for an in-vehicle device according to claim 1, wherein the step of transmitting the at least one context instruction to the host comprises outputting the at least one context instruction through a USB input/output interface to the host.

9. A voice control method for an in-vehicle device, suitable for a base of a portable information capturing device, the voice control method for the in-vehicle device comprising:
mounting the portable information capturing device on the base, wherein the base is configured to charge the portable information capturing device and is connected to a host of the in-vehicle device;
receiving, by the base, an audio signal from the portable information capturing device, wherein the portable information capturing device detects an ambient sound by using an audio collecting unit and generates the audio signal therefrom;
performing, by the base, voice recognition on the audio signal to generate at least one context instruction; and
transmitting, by the base, the at least one context instruction to the host to enable the host to correspondingly control an operation of at least one function module of the in-vehicle device according to the at least one context instruction to perform at least one context operation.

10. A voice control system for an in-vehicle device, comprising:
a portable information capturing device, the portable information capturing device comprising an audio collecting unit configured to detect an ambient sound and generate an audio signal therefrom;
a base, configured to mount and charge the portable information capturing device, the base comprising:
a first connecting unit, electrically and signally coupled to the portable information capturing device when the portable information capturing device is mounted on the base, configured to receive the audio signal;
a voice recognition engine, electrically and signal coupled to the first connecting unit, configured to perform voice recognition on the audio signal to generate at least one context instruction; and
a second connecting unit, electrically and signally coupled to the voice recognition engine, configured to output the at least one context instruction;
at least one function module, individually performing a context operation; and
a host, electrically and signally coupled to the second connecting unit and the at least one function module, configured to receive the at least one context instruction outputted from the second connecting unit, and to correspondingly control an operation of the at least one function module according to the at least one context instruction.

11. The voice control system for an in-vehicle device according to claim 10, wherein the at least one context instruction comprises an audio recording activating instruction, an audio recording deactivating instruction, a video recording activating instruction, a video recording deactivating instruction, an alert turning-on instruction, an alert turning-off instruction, a help instruction, or any combination thereof.

12. The voice control system for an in-vehicle device according to claim 10, wherein the at least one function module is an audio recording module, an image capturing unit, an alert light, a network module, or any combination thereof.

13. The voice control method for an in-vehicle device according to claim 1, wherein the voice recognition engine comprises:
a translation circuit, electrically and signally coupled to the first connecting unit, configured to translate the audio signal; and
a recognition circuit, electrically and signally coupled to the translation circuit, configured to perform voice recognition on the translated audio signal.

14. The voice control system for an in-vehicle device according to claim 13, wherein the voice recognition engine further comprises:
a one-to-many router circuit, electrically and signally coupled between the translation circuit and the recognition circuit and between the first connecting unit and the second connecting unit, configured to duplicate the audio signal to obtain a plurality of input audios, and to output the input audios to the recognition circuit and the host.

15. The voice control system for an in-vehicle device according to claim 14, wherein the second connecting unit is an audio input/output router, and the audio input/output router is configured to output one of the input audios to the host.

16. The voice control system for an in-vehicle device according to claim 10, wherein the second connecting unit is a USB input/output interface, and the voice recognition engine outputs the at least one context instruction to the host through the USB input/output interface.

17. The voice control system for an in-vehicle device according to claim 10, wherein the base further comprises:
a charging circuit, electrically and signally coupled to the first connecting unit, configured to charge the portable information capturing device when the portable information capturing device is electrically and signally coupled to the first connecting unit.

18. The voice control method for an in-vehicle device according to claim 1, wherein the audio signal is communicated from the portable information capturing device to the base via a first connecting unit electrically and signally coupled to the portable information capturing device when the portable information capturing device is mounted on the base.

19. The voice control method for an in-vehicle device according to claim 9, wherein the audio signal is communicated from the portable information capturing device to the base via a first connecting unit electrically and signally coupled to the portable information capturing device when the portable information capturing device is mounted on the base.

* * * * *